United States Patent
Zhou et al.

(10) Patent No.: US 12,093,168 B2
(45) Date of Patent: Sep. 17, 2024

(54) CONDITIONAL BRANCH COVERAGE CALCULATION METHOD, DEVICE, COMPUTER APPARATUS, STORAGE MEDIUM

(71) Applicant: Glenfly Tech Co., Ltd., Shanghai (CN)

(72) Inventors: Liwen Zhou, Shanghai (CN); Guanfang Xiang, Shanghai (CN); Yunfeng Zhou, Shanghai (CN); Yifei Zhang, Shanghai (CN)

(73) Assignee: Glenfly Tech Co., Ltd., Shanghai (CN)

( * ) Notice: Subject to any disclaimer, the term of this patent is extended or adjusted under 35 U.S.C. 154(b) by 160 days.

(21) Appl. No.: 18/077,413

(22) Filed: Dec. 8, 2022

(65) Prior Publication Data
US 2024/0012648 A1    Jan. 11, 2024

(30) Foreign Application Priority Data
Jul. 7, 2022    (CN) .......................... 202210793302.3

(51) Int. Cl.
| | | |
|---|---|---|
| *G06F 11/36* | (2006.01) | |
| *G06F 8/53* | (2018.01) | |
| *G06F 8/77* | (2018.01) | |
| *G06F 9/30* | (2018.01) | |
| *G06F 9/38* | (2018.01) | |

(52) U.S. Cl.
CPC ............ *G06F 11/3676* (2013.01); *G06F 8/53* (2013.01); *G06F 8/77* (2013.01); *G06F 9/30058* (2013.01); *G06F 9/3844* (2013.01); *G06F 11/3616* (2013.01); *G06F 11/364* (2013.01)

(58) Field of Classification Search
CPC ............... G06F 11/364; G06F 11/3616; G06F 11/3676; G06F 8/77; G06F 8/53
See application file for complete search history.

(56) References Cited

U.S. PATENT DOCUMENTS

| 8,473,907 B1 * | 6/2013 | Zandi ................. G06F 11/3616 |
| | | 714/38.1 |
| 2002/0095660 A1 * | 7/2002 | O'Brien ............... G06F 11/364 |
| | | 714/E11.2 |

(Continued)

OTHER PUBLICATIONS

Narisawa et al, WO 2013108730, Jul. 25, 2013, 17 pgs <WO_2013108730.pdf>.*

(Continued)

*Primary Examiner* — Tuan A Vu

(57) ABSTRACT

The present disclosure relates to a conditional branch coverage calculation method and device, computer apparatus, storage medium and computer program product. The method includes: acquiring code types of uncovered conditional branch code lines in target code, and acquiring comment information corresponding to the uncovered conditional branch code lines according to the code type; acquiring coverage parameter corresponding to the uncovered conditional branch code lines according to the comment information corresponding to the uncovered conditional branch code lines; and calculating a conditional branch coverage corresponding to the target code according to the coverage parameters corresponding to the uncovered conditional branch code lines and a total number of conditional branch code lines in the target code.

18 Claims, 2 Drawing Sheets

Code types of uncovered conditional branch code lines in a target code are acquired, and comment information corresponding to the uncovered conditional branch code lines according to the code types is acquired — 102

Coverage parameters corresponding to the uncovered conditional branch code lines are acquired according to the comment information corresponding to the uncovered conditional branch code lines — 104

The conditional branch coverage corresponding to the target code is calculated according to the coverage parameters corresponding to the uncovered conditional branch code lines and a total number of the conditional branch code lines in the target code — 106

(56) References Cited

U.S. PATENT DOCUMENTS

2014/0165045 A1* 6/2014 Calcagno .................. G06F 8/77
717/125
2018/0165079 A1* 6/2018 Isshiki ...................... G06F 8/53

OTHER PUBLICATIONS

Fu et al, CN 106874187, (translation), 17 pp. Sep. 11, 2020 <CN_106874187.pdf>.*

* cited by examiner

```
if (m_InstanceNumber == -1)//COVEXCLUDET
{
    for (int k=0; k < m_ConfiguredInstanceNumber; ++k)//COVEXCLUDETF
    {
        if (s_FileNameAll [k] != NULL)//COVEXCLUDETF
            delete [] s_FileNameAll[k];
    }
}
```

```
/** COVEXCLUDET start **/
if((x >= y && y >= z) || (x <= y && y <= z)) tmp = y;
else if ((y >= x && x >= z) || (y <= x && x <= z)) tmp = x;
/** COVEXCLUDET end **/
```

CONDITIONAL BRANCH COVERAGE CALCULATION METHOD, DEVICE, COMPUTER APPARATUS, STORAGE MEDIUM

CROSS-REFERENCE TO RELATED APPLICATIONS

This application claims priority of Chinese Patent Application No. 2022107933023, entitled "CONDITIONAL BRANCH COVERAGE CALCULATION METHOD, DEVICE, COMPUTER APPARATUS, STORAGE MEDIUM", filed on Jul. 7, 2022, the entire content of which is incorporated herein by reference.

TECHNICAL FIELD

This disclosure relates to the field of computer technology, and in particular, to a conditional branch coverage calculation method, device, computer apparatus and storage medium.

BACKGROUND

Generally speaking, in order to ensure the quality of a project, the project needs to carry out several rounds of testing. In addition to the common unit testing, integration testing, functional testing, and regression testing, a code coverage testing is also required to ensure the integrity and comprehensiveness of code testing. If the code coverage testing is not up to standard, it means that there are still some codes that have not been fully tested. These untested codes may have bugs, such that the quality of the project cannot be guaranteed. Therefore, the code coverage testing is very important. However, in some cases, the conditional branches of some codes are unnecessary to be covered or impossible to be covered, resulting in an inaccurate and unreliable result of the coverage report, which cannot meet the code testing requirements of some sophisticated projects. The accuracy of test coverage needs to be continuously improved.

SUMMARY

Accordingly, it is necessary to provide a conditional branch coverage calculation method, device, computer apparatus, computer readable storage medium and computer program product capable of accurately calculating the conditional branch coverage.

In a first aspect, the present disclosure provides a conditional branch coverage calculation method, and the method includes: acquiring code types of uncovered conditional branch code lines in a target code, and acquiring comment information corresponding to the uncovered conditional branch code lines according to the code types; acquiring coverage parameters corresponding to the uncovered conditional branch code lines according to the comment information corresponding to the uncovered conditional branch code lines; and calculating a conditional branch coverage corresponding to the target code according to the coverage parameters corresponding to the uncovered conditional branch code lines and a total number of the conditional branch code lines in the target code.

In one of the optional embodiments of the present disclosure, a method for acquiring the uncovered conditional branch code lines in the target code includes: acquiring a basic conditional branch coverage of the target code; and acquiring the uncovered conditional branch code lines in the target code according to the basic conditional branch coverage of the target code.

In one of the optional embodiments of the present disclosure, before the acquiring the code types of the uncovered conditional branch code lines in target code, and acquiring the comment information corresponding to the uncovered conditional branch code lines according to the code type, the method further includes: acquiring each of the conditional branch code lines in the target code, and identifying the code type of each of the conditional branch code lines in the target code; and determining a comment type corresponding to each of the conditional branch code lines according to the code type of each of the conditional branch code lines, and adding the comment information to each of the conditional branch code lines according to the comment type of each of the conditional branch code lines in the target code.

In one of the optional embodiments of the present disclosure, the determining the comment type corresponding to each of the conditional branch code lines according to the code type of each of the conditional branch code lines, and adding the comment information to each of the conditional branch code lines according to the comment type of each of the conditional branch code lines in the target code includes: determining that one of the conditional branch code lines corresponds to a first comment type if the code type of the one of the conditional branch code lines is a first code type, wherein the first comment type comprises a first comment information, a second comment information, a third comment information and a fourth comment information, and adding one of the first comment information, the second comment information, the third comment information and the fourth comment information to the one of the conditional branch code lines corresponding to the first code type, or adding no comment information to the one of the conditional branch code lines corresponding to the first code type; determining that the one of the conditional branch code lines correspond to a second comment type if the code type of the one of the conditional branch code lines is a second code type, wherein the second comment type comprises a fifth comment information, and adding the fifth comment information to the one of the conditional branch code lines corresponding to the second code type, or adding no comment information to the one of the conditional branch code lines corresponding to the second code type; wherein the first comment information is configured to indicate that a first part of the corresponding conditional branch code line is excluded, the second comment information is configured to indicate that a second part of the corresponding conditional branch code line is excluded, the third comment information is configured to indicate that the first part or the second part of the conditional branch code line is excluded, the fourth comment information is configured to indicate that both of the first part and the second part of the corresponding conditional branch code lines are excluded, and the fifth comment information is configured to indicate that the whole corresponding conditional branch code line is excluded.

In one of the optional embodiments of the present disclosure, the acquiring the coverage parameter corresponding to the one of the uncovered conditional branch code lines according to the comment information corresponding to the one of the uncovered conditional branch code lines includes: acquiring an uncovered type corresponding to the one of the uncovered conditional branch code lines if the code type of the one of the conditional branch code lines is the first code type, wherein the uncovered types comprise a first part covered, a second part covered, and a fully uncovered; determining that the coverage parameter corresponding to the one of the uncovered conditional branch code lines is 0 if the uncovered type of the one of the uncovered conditional branch code lines is the first part covered, and the comment information corresponding to the one of the uncovered conditional branch code lines is the second comment information, the third comment information or the fourth comment information; determining that the coverage parameter corresponding to the one of the uncovered conditional branch code lines is −1 if the uncovered type of the one of the uncovered conditional branch code lines is the first part covered, and the comment information corresponding to the one of the uncovered conditional branch code lines is not the second comment information, the third comment information or the fourth comment information; determining that the coverage parameter corresponding to the one of the uncovered conditional branch code lines is 0 if the uncovered type of the one of the uncovered conditional branch code lines is the second part covered, and the comment information corresponding to the one of the uncovered conditional branch code lines is the first comment information, the third comment information or the fourth comment information; determining that the coverage parameter corresponding to the one of the uncovered conditional branch code lines is −1 if the uncovered type of the one of the uncovered conditional branch code lines is the second part covered, and the comment information corresponding to the one of the uncovered conditional branch code lines is not the first comment information, the third comment information or the fourth comment information; determining that the coverage parameter corresponding to the one of the uncovered conditional branch code lines is 0 if the uncovered type of the one of the uncovered conditional branch code lines is the fully uncovered, and the comment information corresponding to the one of the uncovered conditional branch code lines is the fourth comment information; determining that the coverage parameter corresponding to the one of the uncovered conditional branch code lines is −1 if the uncovered type of the one of the uncovered conditional branch code lines is the fully uncovered, and the comment information corresponding to the one of the uncovered conditional branch code lines is the first comment information, the second comment information or the third comment information; determining that the coverage parameter corresponding to the one of the uncovered conditional branch code lines is −2 if the one of the uncovered type of the uncovered conditional branch code lines is the fully uncovered, and the comment information corresponding to the one of the uncovered conditional branch code lines is not the first comment information, the second comment information, the third comment information or the fourth comment information; determining that the coverage parameter corresponding to the one of the uncovered conditional branch code lines is 0 if the code type of the one of the conditional branch code lines is the second code type, and the comment information corresponding to the one of the uncovered conditional branch code lines is the fifth comment information; and determining that the coverage parameter corresponding to the one of the uncovered conditional branch code lines is −1 if the code type of the one of the conditional branch code lines is the second code type, and the comment information corresponding to the one of the uncovered conditional branch code lines is not the fifth comment information.

In one of the optional embodiments of the present disclosure, the calculating the conditional branch coverage corresponding to the target code according to the coverage parameters corresponding to the uncovered conditional branch code lines and the total number of conditional branch code lines in the target code includes: calculating a number of the conditional branch coverage corresponding to the target code by adding the total number of the conditional branch code lines in the target code and the coverage parameters corresponding to each of the uncovered conditional branch code lines in the target code; and calculating the conditional branch coverage corresponding to the target code according to a ratio of the number of the conditional branch coverage to the total number of the conditional branch code lines in the target code.

In a second aspect, the present disclosure provides a conditional branch coverage calculation device, which includes a comment identification module, a parameter calculation module and a coverage calculation module. The comment identification module is configured to acquire code types of uncovered conditional branch code lines in a target code, and acquire comment information corresponding to the uncovered conditional branch code lines according to the code type. The parameter calculation module is configured to acquire coverage parameters corresponding to the uncovered conditional branch code lines according to the comment information corresponding to the uncovered conditional branch code lines. The coverage calculation module is configured to calculate a conditional branch coverage corresponding to the target code according to the coverage parameters corresponding to the uncovered conditional branch code lines and a total number of conditional branch code lines in the target code.

In a third aspect, the present disclosure provides a computer apparatus, which includes one or more memories and one or more processors. One or more programs are stored in the one or more memories, and when the one or more programs are executed by the one or more processors, the computer apparatus executes steps of the method according to any one of the embodiments in the first aspect.

In a fourth aspect, the present disclosure provides a non-transitory computer-readable storage medium, on which a computer program is stored. When the computer program is executed by a processor, steps of the method according to any one of the embodiments in the first aspect are executed.

In a fifth aspect, the present disclosure provides a computer program product, which includes a computer program. When the computer program is executed by a processor, steps of the method according to any one of the embodiments in the first aspect are executed.

DETAILED DESCRIPTION

In order to make the purpose, technical solutions and advantages of the present disclosure clearer, the present disclosure will be further described in detail below with reference to the accompanying drawings and embodiments. It should be understood that the specific embodiments described herein are only used to explain the present disclosure, but not to limit the present disclosure.

Commonly used code coverage statistical standards include function coverage, condition coverage, branch coverage, and statement coverage. The statement coverage is calculated by dividing a number of covered statements by a total number of the statements, the function coverage is calculated by dividing a number of covered functions by a total number of the functions, the conditional coverage is calculated by dividing a number of covered conditions by a total number of conditions, and the branch coverage is also calculated by dividing a number of covered branches by a total number of branches. Generally, the conditional branch coverage is calculated by dividing a number of conditional branches covered by codes by a total number of conditional branches.

Figures 1, 2, 3:
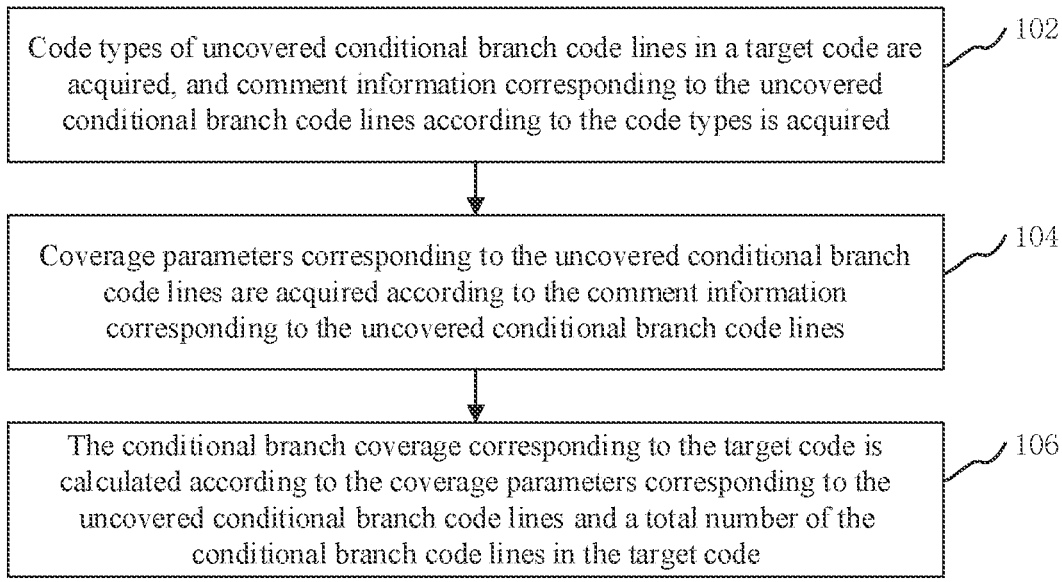
FIG. 1 is a schematic flowchart of a conditional branch coverage calculation method according to an embodiment.
FIG. 2 is a schematic diagram showing an effect of a method for adding comment information by line according to an embodiment.
FIG. 3 is a schematic diagram showing an effect of a method for adding comment information in batches according to an embodiment.

In an embodiment, as shown in FIG. 1, a conditional branch coverage calculation method is provided. In this embodiment, taking the method applied to a terminal as an example. The terminal can include at least one processor and at least one memory. The steps of the method can be executed by the terminal. It can be understood that the method can also be applied to a server, and can also be applied to a system including a terminal and a server, and the method can be realized through an interaction of the terminal and the server. In this embodiment, the method includes the following steps.

In step 102, code types of uncovered conditional branch code lines in a target code are acquired, and comment information corresponding to the uncovered conditional branch code lines according to the code types is acquired. The code types refer to conditional branch statement types of the conditional branch code lines, and the conditional branch statement types include an if statement (condition/decision), a switch statement (switch/case), a ternary operator, and the like. The uncovered conditional branch code lines are obtained by calculating a basic conditional branch coverage of the target code by using an existing code coverage calculation method.

In detail, according to test requirements, the comment information is first added to the code lines that do not need to be covered in the target code. The comment information is configured to indicate that the corresponding conditional branch code line will be excluded or a branch of the corresponding conditional branch code line will be excluded. Next, the basic conditional branch coverage of the target code is calculated using an existing code coverage calculation method to obtain a basic conditional branch coverage of the target code. At the same time, all uncovered conditional branch code lines in the target code can be determined. For example, a Bullseye software can be adopted to calculate the conditional branch coverage of the target code. Then, the code type of each of the uncovered conditional branch code lines in the target code is identified, and the comment information corresponding to each of the uncovered conditional branch code lines according to the code type is detected and identified.

In step 104, coverage parameters corresponding to the uncovered conditional branch code lines are acquired according to the comment information corresponding to the uncovered conditional branch code lines.

An absolute value of each of the coverage parameters represents a number of units corresponding to one of the conditional branch code lines when the code statements are counted, and the coverage parameter is usually 0, −1, or −2.

In detail, according to the comment information corresponding to the uncovered conditional branch code lines, it can be determined whether the uncovered conditional branch code lines are excluded. Excluded means that the excluded part do not need to be calculated into the code coverage. For some code types, the conditional branch code lines may be excluded in two ways: all code lines are excluded, and one branch of the code lines is excluded. The comment information corresponding to the conditional branch code lines of different code types are different. Therefore, the code types and exclusion situations can be determined according to the comment information of the uncovered conditional branch code lines, so as to determine the coverage parameters corresponding to the uncovered conditional branch code lines. Similarly, the coverage parameter corresponding to each of the uncovered conditional branch code lines can be determined.

In step 106, the conditional branch coverage corresponding to the target code is calculated according to the coverage parameters corresponding to the uncovered conditional branch code lines and a total number of the conditional branch code lines in the target code.

The total number of the conditional branch code lines refers to a number of code lines belonging to the conditional branch type in the target code.

In detail, a sum of the coverage parameters is obtained by adding the coverage parameters corresponding to each of the uncovered conditional branch code lines, and then a total number of the coverage parameters is added to the total number of the conditional branch code lines in the target code to obtain a total number of covered conditional branch code lines and excluded conditional branch code lines in the target code. The total number of the covered conditional branch code lines and the excluded conditional branch code lines in the target code is taken as the number of the conditional branch coverage corresponding to the target code. A ratio of the number of the conditional branch coverage corresponding to the target code to the total number of the conditional branch code lines in the target code is taken as the conditional branch coverage corresponding to the target code.

In the above conditional branch coverage calculation method, the code types of the uncovered conditional branch code lines in the target code are acquired, the comment information corresponding to the uncovered conditional branch code lines is acquired according to the code types. The coverage parameters corresponding to the uncovered conditional branch code lines are acquired according to the comment information corresponding to the uncovered conditional branch code lines. The conditional branch coverage corresponding to the target code is calculated according to the coverage parameters corresponding to the uncovered conditional branch code lines and the total number of the conditional branch code lines in the target code. Conditional branch code lines that do not need to be calculated can be excluded according to the comment information corresponding to each of the conditional branch code lines, thereby improving the calculation accuracy of the conditional branch coverage.

In an embodiment, the method for acquiring the uncovered conditional branch code lines in the target code includes: the basic conditional branch coverage of the target code is acquired; the uncovered conditional branch code lines in the target code are acquired according to the basic conditional branch coverage of the target code.

In detail, the basic conditional branch coverage of the target code is calculated by the Bullseye software, and the total number of the conditional branch code lines in the target code and all of the uncovered conditional branch code lines can be obtained through the Bullseye software.

In an embodiment, before the code types of the uncovered conditional branch code lines in the target code are acquired and the comment information corresponding to the uncovered conditional branch code lines is acquired according to the code types, the method further includes: each of the conditional branch code lines in the target code is acquired, and the code type of each of the conditional branch code lines in the target code is identified; the comment type corresponding to each of the conditional branch code lines is determined according to the code type of each of the conditional branch code lines, and the comment information is added to each of the conditional branch code lines according to the comment type of each of the conditional branch code lines in the target code.

Further, the step that the comment type corresponding to each of the conditional branch code lines is determined according to the code type of each of the conditional branch code lines, and the comment information is added to each of the conditional branch code lines according to the comment type corresponding to each of the conditional branch code lines in the target code further includes: The conditional branch code lines is determined to correspond to a first comment type if the code type of one of the conditional branch code lines is a first code type. The first comment type includes a first comment information, a second comment information, a third comment information and a fourth comment information, and one of the first comment information, the second comment information, the third comment information and the fourth comment information is added to the one of the conditional branch code lines corresponding to the first code type, or no comment information is added to the one of the conditional branch code lines corresponding to the first code type. The conditional branch code lines are determined to correspond to a second comment type if the code type of one of the conditional branch code lines is a second code type. The second comment type includes a fifth comment information. The fifth comment information is added to the one of the conditional branch code lines corresponding to the second code type, or no comment information is added to the one of the conditional branch code lines corresponding to the second code type. The first comment information is configured to indicate that a first part of the corresponding conditional branch code line is excluded. The second comment information is configured to indicate that a second part of the corresponding conditional branch code line is excluded. The third comment information is configured to indicate that the first part or the second part of the corresponding conditional branch code lines is excluded. The fourth comment information is configured to indicate that both of the first part and the second part of the corresponding conditional branch code lines are excluded. The fifth comment information is configured to indicate that the whole corresponding conditional branch code lines are excluded.

In detail, a set of exclusion rules is developed according to test requirements. The comment information "covexclude" is added to corresponding "condition/decision/switch code" statements to be excluded according to the exclusion rules, such that the conditional branch coverage can be recalculated by reading the relevant comments. There are two methods to add the comment information.

A first way to add the comment information is line-by-line (also known as line exclusion), which is completed by adding relevant comment information after each code line, to achieve single-line exclusion (excludeT/F). A second way is to add the comment information in batches, which is completed by adding the relevant comment information before and after a code segment that needs to be excluded (excludeT/F). The exclusion rules for line exclusion in the first way are shown in Table 1, and the Table 1 will be explained below.

TABLE 1

| Code Type | Exclusion | Comment information |
|---|---|---|
| condition/decision | T | covexcludeT |
|  | F | covexcludeF |
|  | T or F | covexcludeTorF |
|  | T & F | covexcludeTF |
| switch/case | X | covexcludeC |

An application example of the first way to add the comment information is shown in FIG. 2.

The second way is to add the comment information in batches (also known as batch exclusion), which adds the comment information / COVEXCLUDE start / in front of the code segment that needs to be excluded, and adds the comment information / COVEXCLUDE end / after the code segment that needs to be excluded to achieve the batch exclusion (excludeT/F). The rules of the second way are shown in Table 2, and the Table 2 will be explained below.

TABLE 2

| Code Type | Exclusion | Comment information |
|---|---|---|
| condition/decision | T | /* COVEXCLUDET start */<br>...code...<br>/* COVEXCLUDET end */ |
|  | F | /* COVEXCLUDEF start */<br>...code...<br>/* COVEXCLUDEF end */ |
|  | T or F | /* COVEXCLUDETorF start */<br>...code...<br>/* COVEXCLUDETorF end */ |
|  | T & F | /* COVEXCLUDETF start */<br>...code...<br>/* COVEXCLUDETF end */ |
| switch/case | X | /* COVEXCLUDEC start */<br>...code...<br>/* COVEXCLUDEC end */ |

An application example of the second way to add the comment information is shown in FIG. 3.

In the above tables, the condition/decision refers to the first code type. Each of the T and F represents a branch of one of the conditional branch code lines, respectively, the T represents the first part of the one of the conditional branch code lines (that is, the true branch of the one of the conditional branch code lines), and the F represents the second part of the one of the conditional branch code lines (that is, the false branch of the one of the conditional branch code lines). covexcludeT, covexcludeF, covexcludeTorF, and covexcludeTF represent the first comment information, the second comment information, the third comment information, and the fourth comment information corresponding to the first code type, respectively. The covexcludeT means to exclude the T branch of the corresponding code line when calculating the coverage, the covexcludeF means to exclude the F branch of the corresponding code line when calculating the coverage, the covexcludeTorF means to exclude the T branch or the F branch of the corresponding code line when calculating the coverage, and the covexcludeTF means to exclude the T branch and the F branch of the corresponding code line when calculating the coverage. If a condition/decision conditional branch code line does not need to be excluded as a whole, no comment information is added to the conditional branch code line. The Switch/case refers to the second code type. The code lines corresponding to the switch/case statements do not involve partial exclusion, an entire code line will be excluded when an exclusion is required. The X represents the entire conditional branch code line, the covexcludeC represents the fifth comment information corresponding to the second code type, and covexcludeC means to exclude the corresponding whole code line. If a switch/case conditional branch code line does not need to be excluded, no comment information is added to the conditional branch code line.

In this embodiment, each of the conditional branch code lines in the target code is acquired and the code type of each of the conditional branch code lines in the target code is identified. The comment type corresponding to each of the conditional branch code lines is determined according to the code type of each of the conditional branch code lines, and the comment information is added to each of the conditional branch code lines according to the comment type of each of the conditional branch code lines in the target code. Different comment information can be added to the code lines according to different test requirements, such that the code lines that do not need to be calculated are excluded in the subsequent conditional branch coverage calculation process, and the calculation accuracy of conditional branch coverage is improved.

In an embodiment, the step of the coverage parameters corresponding to the uncovered conditional branch code lines is acquired according to the comment information corresponding to the uncovered conditional branch code lines includes: The uncovered types corresponding to the uncovered conditional branch code lines is acquired if the code type of the conditional branch code lines is the first code type. The uncovered types include a first part covered, a second part covered, and fully uncovered. The coverage parameter corresponding to one of the uncovered conditional branch code lines is determined as 0 if the uncovered type of the one of the uncovered conditional branch code lines is the first part covered and the comment information corresponding to the one of the uncovered conditional branch code lines is the second comment information, the third comment information or the fourth comment information. The coverage parameter corresponding to the one of the uncovered conditional branch code lines is determined as −1 if the uncovered type of the one of the uncovered conditional branch code lines is the first part covered and the comment information corresponding to the one of the uncovered conditional branch code lines is not the second comment information, the third comment information or the fourth comment information. The coverage parameter corresponding to the one of the uncovered conditional branch code lines is determined as 0 if the uncovered type of the one of the uncovered conditional branch code lines is the second part covered, and the comment information corresponding to the one of the uncovered conditional branch code lines is the first comment information, the third comment information or the fourth comment information. The coverage parameter corresponding to the one of the uncovered conditional branch code lines is determined as −1 if the uncovered type of the one of the uncovered conditional branch code lines is the second part covered, and the comment information corresponding to the one of the uncovered conditional branch code lines is not the first comment information, the third comment information or the fourth comment information. The coverage parameter corresponding to the one of the uncovered conditional branch code lines is determined as 0 if the uncovered type of the one of the uncovered conditional branch code lines is the fully uncovered, and the comment information corresponding to the one of the uncovered conditional branch code lines is the fourth comment information. The coverage parameter corresponding to the one of the uncovered conditional branch code lines is determined as −1 if the uncovered type of the one of the uncovered conditional branch code lines is the fully uncovered, and the comment information corresponding to the one of the uncovered conditional branch code lines is one of the first comment information, the second comment information and the third comment information. The coverage parameter corresponding to the one of the uncovered conditional branch code lines is determined as −2 if the uncovered type of the one of the uncovered conditional branch code lines is the fully uncovered, and the comment information corresponding to the one of the uncovered conditional branch code lines is not the first comment information, the second comment information, the third comment information or the fourth comment information. The coverage parameter corresponding to the one of the uncovered conditional branch code lines is determined as 0 if the code type of the conditional branch code lines is the second code type, and the comment information corresponding to the one of the uncovered conditional branch code lines is the fifth comment information. The coverage parameter corresponding to the one of the uncovered conditional branch code lines is determined as −1 if the code type of the conditional branch code lines is the second code type, and the comment information corresponding to the one of the uncovered conditional branch code lines is not the fifth comment information.

In detail, when determining the code type, if the code type of one of the code lines is condition/decision, the one of the code lines accounts for 2 in totalcov (also known as total number of coy or total coverage), and the totalcov refers to the total number of the conditional branch code lines on a condition that the target code is assumed to be fully covered, that is, the total number of the conditional branch code lines in the target code. First, an initial total number of the conditional branch code lines newcov is set to be equal to the totalcov. Then, whether the line comment information or the batch comment information covexclude exists is determined. If the line comment information or the batch comment information covexclude exists, the total number of the conditional branch code lines is determined as equal to newcov-1/newcov-0/newcov-2 according to the following Table 3 when calculating the conditional branch coverage, if the line comment information or the batch comment information covexclude does not exist, that the total number of the conditional branch code lines is directly determined as equal to newcov-2. If the code type of one of the code lines is switch/case, the one of the code lines accounts for 1 in the total number of coy, and then whether the comment information covexclude exists is determined. If the comment information covexclude exists, the total number of the conditional branch code lines is determined as equal to newcov-1/newcov-0 when calculating the conditional branch coverage. if the comment information covexclude does not exist, the total number of the conditional branch code lines is directly determined as equal to newcov-1.

As shown in Table 3, if one of the conditional branch code lines of the condition/decision code type do not cover the T, F or T and F, the one of the conditional branch code lines will be regarded as an uncovered conditional branch code line. In practice, if the one of the conditional branch code lines covers the T, F and X, it is considered that the current code line has been covered, so it does not belong to the uncovered conditional branch code line, and the corresponding coverage parameter is 0.

TABLE 3

| Code type | Total number | Actual coverage situation | newcov is deducted based on coverage parameters | |
|---|---|---|---|---|
| | | | Comment information | Coverage parament |
| condition/ decision | 2 | T is covered, F is not covered | CovexcludeF CovexcludeTorF CovexcludeTF | 0 |
| | | | Other cases | −1 |
| | | F is covered, T is not covered | CovexcludeT CovexcludeTorF CovexcludeTF | 0 |
| | | | Other cases | −1 |
| | | T and F are covered | All cases | 0 |
| | | 0 (nothing is covered) | CovexcludeT CovexcludeF CovexcludeTorF | −1 |
| | | | CovexcludeTF | 0 |
| | | | Other cases | −2 |
| Switch-case/ Try-catch etc. | 1 | 0 (nothing is covered) | CovexcludeC | 0 |
| | | | Other cases | −1 |
| | | X (X is covered) | Other cases | 0 |

In an embodiment, the step of the conditional branch coverage corresponding to the target code is calculated according to the coverage parameters corresponding to the uncovered conditional branch code lines and the total number of the conditional branch code lines in the target code includes: the number of the conditional branch coverage corresponding to the target code is calculated by adding the total number of the conditional branch code lines in the target code to the coverage parameters corresponding to each of the uncovered conditional branch code lines in the target code; and the conditional branch coverage corresponding to the target code is calculated according to a ratio of the number of the conditional branch coverage corresponding to the target code to the total number of the conditional branch code lines in the target code.

In detail, by traversing the comment information and the code type corresponding to each of the code lines, newcov-1/newcov-2/newcov-0 can be used to repeatedly calculate the number of the conditional branch coverage after excluding some conditional branch code lines. The number of calculation times is equal to the number of uncovered conditional branch code lines. Finally, the conditional branch coverage is calculated by dividing the final calculated newcov by totalcov.

In an embodiment, a method for calculating conditional branch coverage includes:

Each of the conditional branch code lines is acquired in the target code, and the code type of each of the conditional branch code lines in the target code is identified. One of the conditional branch code lines corresponds to a first comment type if the code type of the one of the conditional branch code lines is a first code type. The first comment type includes a first comment information, a second comment information, a third comment information and a fourth comment information. One of the first comment information, the second comment information, the third comment information and the fourth comment information is added to the one of the conditional branch code lines corresponding to the first code type, or no comment information is added to the one of the conditional branch code lines corresponding to the first code type. The one of the conditional branch code lines is determined to correspond to a second comment type if the code type of the one of the conditional branch code lines is a second code type. The second comment type includes a fifth comment information. The fifth comment information is added to the one of the conditional branch code lines corresponding to the second code type, or no comment information is added to the one of the conditional branch code lines corresponding to the second code type. The first comment information is configured to indicate that a first part of the corresponding conditional branch code line is excluded, the second comment information is configured to indicate that a second part of the corresponding conditional branch code line is excluded, and the third comment information is configured to indicate that the first part or the second part of the corresponding conditional branch code lines is excluded. The fourth comment information is configured to indicate that both of the first part and the second part of the corresponding conditional branch code line are excluded, and the fifth comment information is configured to indicate that the whole corresponding conditional branch code line is excluded.

The basic conditional branch coverage of the target code is acquired; and the uncovered conditional branch coverage code lines in the target code is acquired according to the basic conditional branch coverage of the target code. The code types of the uncovered conditional branch code lines of the target code are acquired, and the comment information corresponding to the uncovered conditional branch code lines is acquired according to the code types.

the uncovered type corresponding to one of the uncovered conditional branch code lines is acquired if the code type of the one of the conditional branch code lines is the first code type. The uncovered types include the first part covered, the second part covered, and the fully uncovered. The coverage parameter corresponding to the one of the uncovered conditional branch code lines is determined as 0 if the uncovered type of the one of the uncovered conditional branch code lines is the first part covered and the comment information corresponding to the one of the uncovered conditional branch code lines is the second comment information, the third comment information or the fourth comment information. The coverage parameter corresponding to the one of the uncovered conditional branch code lines is determined as −1 if the uncovered type of the one of the uncovered conditional branch code lines is the first part covered and the comment information corresponding to the one of the uncovered conditional branch code lines is not the second comment information, the third comment information or the fourth comment information. The coverage parameter corresponding to the one of the uncovered conditional branch code lines is determined as 0 if the uncovered type of the one of the uncovered conditional branch code lines is the second part covered, and the comment information corresponding to the one of the uncovered conditional branch code lines is the first comment information, the third comment information or the fourth comment information. The coverage parameter corresponding to the one of the uncovered conditional branch code lines is determined as −1 if the uncovered type of the one of the uncovered conditional branch code lines is the second part covered, and the comment information corresponding to the one of the uncovered conditional branch code lines is not the first comment information, the third comment information or the fourth comment information. The coverage parameter corresponding to the one of the uncovered conditional branch code lines is determined as 0 if the uncovered type of the one of the uncovered conditional branch code lines is the fully uncovered, and the comment information corresponding to the one of the uncovered conditional branch code lines is the fourth comment information. The coverage parameter corresponding to the one of the uncovered conditional branch code lines is determined as −1 if the uncovered type of the one of the uncovered conditional branch code lines is the fully uncovered, and the comment information corresponding to the one of the uncovered conditional branch code lines is the first comment information, the second comment information or the third comment information. The coverage parameter corresponding to the one of the uncovered conditional branch code lines is determined as −2 if the uncovered type of the one of the uncovered conditional branch code lines is the fully uncovered, and the comment information corresponding to the one of the uncovered conditional branch code lines is not the first comment information, the second comment information, the third comment information or the fourth comment information. The coverage parameter corresponding to the one of the uncovered conditional branch code lines is determined as 0 if the code type of the one of the conditional branch code lines is the second code type, and the comment information corresponding to the one of the uncovered conditional branch code lines is the fifth comment information. The coverage parameter corresponding to the one of the uncovered conditional branch code lines is determined as −1 if the code type of the one of the conditional branch code lines is the second code type, and the comment information corresponding to the one of the uncovered conditional branch code lines is not the fifth comment information.

The number of the conditional branch coverage corresponding to the target code is calculated by adding the total number of the conditional branch code lines in the target code and the coverage parameters corresponding to each of the uncovered conditional branch code lines in the target code; and the conditional branch coverage corresponding to the target code is calculated according to the ratio of the number of the conditional branch coverage corresponding to the target code to the total number of the conditional branch code lines in the target code.

It should be understood that, although the steps in the flowcharts involved in the above embodiments are sequentially shown by the indications of the arrows, these steps are not necessarily executed in the order indicated by the arrows. Unless explicitly stated herein, the execution of these steps is not strictly limited to the order, and the steps may be executed in other orders. Moreover, at least a part of the steps in the flowcharts involved in the above embodiments may include multiple steps or multiple stages, and these steps or stages are not necessarily executed and completed at the same time, but may be performed at different times. The execution order of these steps or stages is not necessarily sequential, but may be performed alternately or in turn with other steps or at least a part of the steps or stages of the other steps.

Based on the same inventive concept, an embodiment of the present disclosure further provides a conditional branch coverage calculation device 400 for implementing the aforementioned conditional branch coverage calculation method. The implementation scheme for solving the problem provided by this device is similar to the implementation scheme described in the above method, so the specific limitations in the embodiments of one or more conditional branch coverage calculation device 400 provided below can refer to the above limitations on the conditional branch coverage calculation method, and which are not repeated herein.

Figure 4:
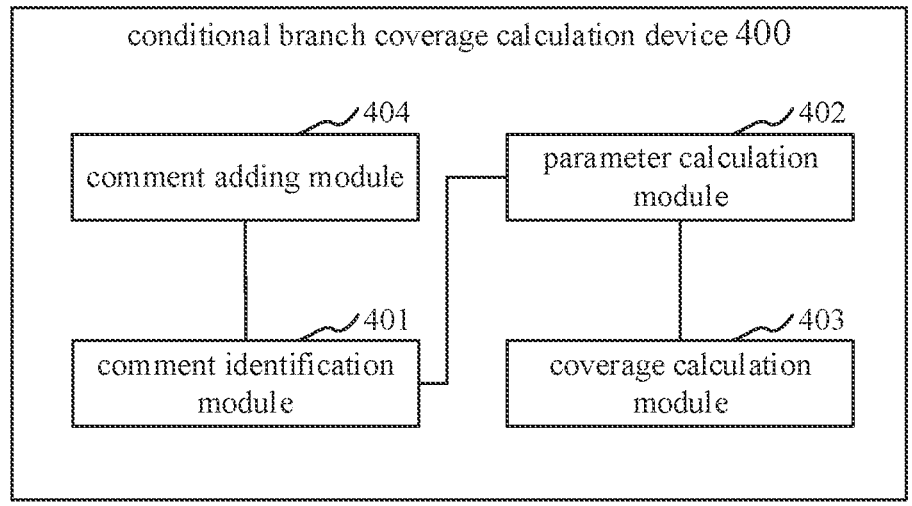
FIG. 4 is a block diagram of a conditional branch coverage calculation device according to an embodiment.

In an embodiment, as shown in FIG. 4, a conditional branch coverage calculation device 400 is provided. The conditional branch coverage calculation device 400 includes a comment identification module 401, a parameter calculation module 402, and a coverage calculation module 403.

The comment identification module 401 is configured to acquire the code types of the uncovered conditional branch code lines in target code, and acquire the comment information corresponding to the uncovered conditional branch code lines according to the code type.

The parameter calculation module 402 is configured to acquire the coverage parameters corresponding to the uncovered conditional branch code lines according to the comment information corresponding to the uncovered conditional branch code lines.

The coverage calculation module 403 is configured to calculate the conditional branch coverage corresponding to the target code according to the coverage parameters corresponding to the uncovered conditional branch code lines and the total number of the conditional branch code lines in the target code.

In an embodiment, the comment identification module 401 is further configured to acquire the basic conditional branch coverage of the target code, and acquire the uncovered conditional branch code lines of the target code according to the basic conditional branch coverage of the target code.

In an embodiment, the device further includes:
a comment adding module 404 configured to acquire each of the conditional branch code lines in the target code, and identify the code type of each of the conditional branch code lines in the target code; determine the comment type of each of the conditional branch code lines according to the code type of each of the conditional branch code lines, and add the comment information to each of the conditional branch code lines according to the comment type corresponding to each of the conditional branch code lines in the target code.

In an embodiment, the comment adding module 404 is further configured to determine that one of the conditional branch code lines corresponds to the first comment type if the code type of the conditional branch code lines is the first code type. The first comment type includes the first comment information, the second comment information, the third comment information and the fourth comment information. The comment adding module 404 is further configured to add one of the first comment information, the second comment information, the third comment information and the fourth comment information to the one of the conditional branch code lines corresponding to the first code type, or adds no comment information to the one of the conditional branch code lines corresponding to the first code type; the comment adding module 404 is further configured to determine that one of the conditional branch code lines corresponds to the second comment type if the code type of the conditional branch code lines is the second code type. The second comment type includes the fifth comment information. The comment adding module 404 is further configured to add the fifth comment information to the one of the conditional branch code lines, or add no comment information to the one of the conditional branch code lines. The first comment information is configured to indicate that the first part of the corresponding conditional branch code line is excluded, the second comment information is configured to indicate that the second part of the corresponding conditional branch code line is excluded, and the third comment information is configured to indicate that the first part or the second part of the corresponding conditional branch code lines is excluded. The fourth comment information is configured to indicate that both of the first part and the second part of the corresponding conditional branch code line are excluded, and the fifth comment information is configured to indicate that the whole corresponding conditional branch code line is excluded.

In an embodiment, the parameter calculation module 402 is further configured to acquire the uncovered type corresponding to one of the uncovered conditional branch code lines if the code type of the one of the conditional branch code lines is the first code type. The uncovered types include the first part covered, the second part covered, or the fully uncovered. The parameter calculation module 402 is further configured to determine that the coverage parameter corresponding to the one of the uncovered conditional branch code lines is 0 if the uncovered type of the one of the uncovered conditional branch code lines is the first part covered and the comment information corresponding to the one of the uncovered conditional branch code lines is the second comment information, the third comment information or the fourth comment information. The parameter calculation module 402 is further configured to determine that the coverage parameter corresponding to the one of the uncovered conditional branch code lines is −1 if the uncovered type of the one of the uncovered conditional branch code lines is the first part covered and the comment information corresponding to the one of the uncovered conditional branch code lines is not the second comment information, the third comment information or the fourth comment information. The parameter calculation module 402 is further configured to determine that the coverage parameter corresponding to the one of the uncovered conditional branch code lines is 0 if the uncovered type of the one of the uncovered conditional branch code lines is the second part covered, and the comment information corresponding to the one of the uncovered conditional branch code lines is the first comment information, the third comment information or the fourth comment information. The parameter calculation module 402 is further configured to determine that the coverage parameter corresponding to the one of the uncovered conditional branch code lines is −1 if the uncovered type of the one of the uncovered conditional branch code lines is the second part covered, and the comment information corresponding to the one of the uncovered conditional branch code lines is not the first comment information, the third comment information or the fourth comment information. The parameter calculation module 402 is further configured to determine that the coverage parameter corresponding to the one of the uncovered conditional branch code lines is 0 if the uncovered type of the one of the uncovered conditional branch code lines is the fully uncovered, and the comment information corresponding to the one of the uncovered conditional branch code lines is the fourth comment information. The parameter calculation module 402 is further configured to determine that the coverage parameter corresponding to the one of the uncovered conditional branch code lines is −1 if the uncovered type of the one of the uncovered conditional branch code lines is the fully uncovered, and the comment information corresponding to the one of the uncovered conditional branch code lines is one of the first comment information, the second comment information and the third comment information. The parameter calculation module 402 is further configured to determine that the coverage parameter corresponding to the one of the uncovered conditional branch code lines is −2 if the uncovered type of the one of the uncovered conditional branch code lines is the fully uncovered, and the comment information corresponding to the one of the uncovered conditional branch code lines is not the first comment information, the second comment information, the third comment information or the fourth comment information. The parameter calculation module 402 is further configured to determine that the coverage parameter corresponding to the one of the uncovered conditional branch code lines is 0 if the code type of the one of the conditional branch code lines is the second code type, and the comment information corresponding to the one of the uncovered conditional branch code lines is the fifth comment information. The parameter calculation module 402 is further configured to determine that the coverage parameter corresponding to the one of the uncovered conditional branch code lines is −1 if the code type of the one of the conditional branch code lines is the second code type, and the comment information corresponding to the one of the uncovered conditional branch code lines is not the fifth comment information.

In an embodiment, the coverage calculation module 403 is further configured to calculate a number of the conditional branch coverage corresponding to the target code by adding a total number of the conditional branch code lines in the target code and the coverage parameters corresponding to each of the uncovered conditional branch code lines in the target code; and calculate the conditional branch coverage corresponding to the target code according to a ratio of the number of the conditional branch coverage to the total number of the conditional branch code lines in the target code.

The modules in the aforementioned conditional branch coverage calculation device 400 may be implemented in whole or in part by software, hardware, and combinations thereof. The above modules can be embedded in or independent of a processor in a computer apparatus in a form of hardware, or stored in a memory in the computer apparatus in a form of software, such that the processor can call and execute the operations corresponding the above modules.

Figure 5:
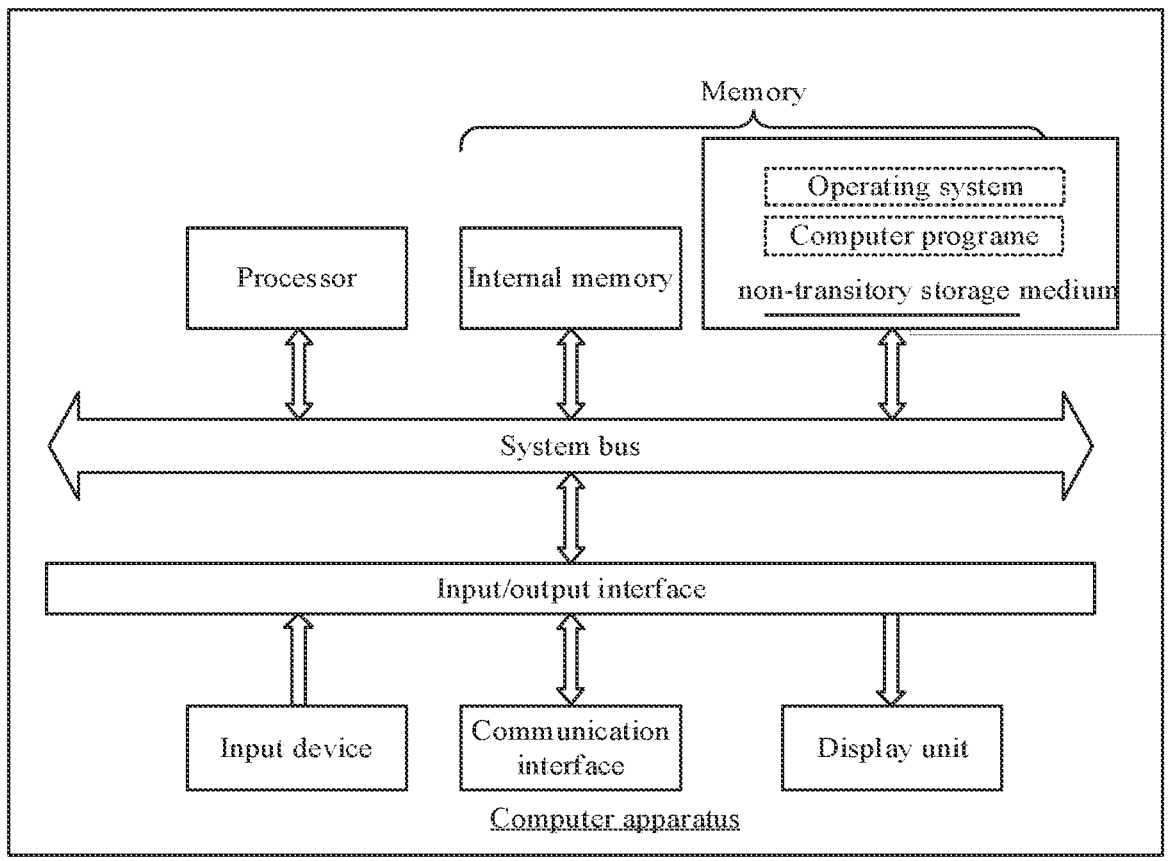
FIG. 5 is a diagram of an inner structure of a computer apparatus according to an embodiment.

In an embodiment, the present disclosure further provides a computer apparatus, which may be a terminal, an inner structure of the computer apparatus is shown in FIG. 5. The computer apparatus includes a processor, a memory, an input/output interface, a communication interface, a display unit, and an input device. The processor, the memory and the input/output interface are connected through a system bus, and the communication interface, the display unit and the input device are connected to the system bus through the input/output interface. The processor of the computer apparatus is configured to provide computing and control capabilities. The memory of the computer apparatus may include a non-transitory storage medium and an internal memory. The non-transitory storage medium stores an operating system and a computer program. The internal memory provides an environment for the operation of the operating system and the computer programs in the non-transitory storage medium. The input/output interface of the computer apparatus is configured to exchange information between the processor and external devices. The communication interface of the computer apparatus is configured to be in wired or wireless communication with the external terminals, and the wireless communication can be realized by WIFI, mobile cellular network, NFC (Near Field Communication) or other technologies. The computer program can be executed by the processor to implement the conditional branch coverage calculation method provided by the above embodiments. The display unit of the computer apparatus is configured to form a visually visible picture, which can be a display screen, a projection device or a virtual reality imaging device, and the display screen may be a liquid crystal display screen or an electronic ink display screen. The input device of the computer apparatus can be a touch layer covered on the display screen, and may also be keys, trackballs or touchpads provided on a housing of the computer apparatus, and can also be an external keyboard, touchpad or mouse.

Those skilled in the art should understand that the structure shown in FIG. 5 is only a block diagram of a part of the structure related to the solution of the present disclosure, and does not constitute a limitation on the computer apparatus to which the solution of the present disclosure is applied. A particular computer apparatus can include more or fewer components, combine certain components, or have a different arrangement of components than those shown in FIG. 5.

In an embodiment, the present disclosure further provides a computer apparatus, which includes a storage and a processor, one or more programs are stored in the memory, the processor implements the following steps when executing the one or more programs:

the code types of uncovered conditional branch code lines in target code are acquired, and the comment information corresponding to the uncovered conditional branch code lines is acquired according to the code type;

the coverage parameters corresponding to the uncovered conditional branch code lines is acquired according to the comment information corresponding to the uncovered conditional branch code lines; and the conditional branch coverage corresponding to the target code is calculated according to the coverage parameters corresponding to the uncovered conditional branch code lines and the total number of the conditional branch code lines in the target code.

In an embodiment, the processor further implements the following steps when executing the one or more programs:

the basic conditional branch coverage of the target code is acquired; and the uncovered conditional branch code lines of the target code are acquired according to the basic conditional branch coverage of the target code.

In an embodiment, the processor further implements the following steps when executing the one or more programs:

each of the conditional branch code lines in the target code is acquired, and the code type of each of the conditional branch code lines in the target codes is identified; and the comment type corresponding to each of the conditional branch code lines is determined according to the code type of each of the conditional branch code lines, and the comment information is added to each of the conditional branch code lines according to the comment type corresponding to each of the conditional branch codes line in the target code.

In an embodiment, the processor further implements the following steps when executing the one or more programs:

One of the conditional branch code lines is determined to correspond to the first comment type if the code type of the one of the conditional branch code lines is the first code type. The first comment type includes the first comment information, the second comment information, the third comment information and the fourth comment information. One of the first comment information, the second comment information, the third comment information and the fourth comment information is added to the one of the conditional branch code lines corresponding to the first code type, or no comment information is added to the one of the conditional branch code lines corresponding to the first code type.

One of the conditional branch code lines is determined to correspond to the second comment type if the code type of the one of the conditional branch code lines is the second code type. The second comment type includes the fifth comment information. The fifth comment information is added to the one of the conditional branch code lines, or no comment information is added to the one of the conditional branch code lines.

The first comment information is configured to indicate that a first part of the corresponding conditional branch code line is excluded. The second comment information is configured to indicate that a second part of the corresponding conditional branch code line is excluded. The third comment information is configured to indicate that the first part or the second part of the corresponding conditional branch code lines is excluded. The fourth comment information is configured to indicate that both of the first part and the second part of the corresponding conditional branch code line are excluded. The fifth comment information is configured to indicate that the whole corresponding conditional branch code line is excluded.

In an embodiment, the processor further implements the following steps when executing the one or more programs:

The uncovered type corresponding to one of the uncovered conditional branch code lines is acquired if the code type of the conditional branch code lines is the first code type. The uncovered types include a first part covered, a second part covered, and a fully uncovered.

The coverage parameter corresponding to the one of the uncovered conditional branch code lines is determined as 0 if the uncovered type of the one of the uncovered conditional branch code lines is the first part covered and the comment information corresponding to the one of the uncovered conditional branch code lines is the second comment information, the third comment information or the fourth comment information.

The coverage parameter corresponding to the one of the uncovered conditional branch code lines is determined as −1 if the uncovered type of the one of the uncovered conditional branch code lines is the first part covered and the comment information corresponding to the one of the uncovered conditional branch code lines is not the second comment information, the third comment information and the fourth comment information.

The coverage parameter corresponding to the one of the uncovered conditional branch code lines is determined as 0 if the uncovered type of the one of the uncovered conditional branch code lines is the second part covered, and the comment information corresponding to the one of the uncovered conditional branch code lines is the first comment information, the third comment information or the fourth comment information.

The coverage parameter corresponding to the one of the uncovered conditional branch code lines is determined as −1 if the uncovered type of the one of the uncovered conditional branch code lines is the second part covered, and the comment information corresponding to the one of the uncovered conditional branch code lines is not the first comment information, the third comment information or the fourth comment information.

The coverage parameter corresponding to the one of the uncovered conditional branch code lines is determined as 0 if the uncovered type of the one of the uncovered conditional branch code lines is the fully uncovered, and the comment information corresponding to the one of the uncovered conditional branch code lines is the fourth comment information.

The coverage parameter corresponding to the one of the uncovered conditional branch code lines is determined as −1 if the uncovered type of the one of the uncovered conditional branch code lines is the fully uncovered, and the comment information corresponding to the one of the uncovered conditional branch code lines is the first comment information, the second comment information or the third comment information.

The coverage parameter corresponding to the one of the uncovered conditional branch code lines is determined as −2 if the uncovered type of the one of the uncovered conditional branch code lines is the fully uncovered, and the comment information corresponding to the one of the uncovered conditional branch code lines is not the first comment information, the second comment information, the third comment information or the fourth comment information. The coverage parameter corresponding to the one of the uncovered conditional branch code lines is determined as 0 if the code type of the conditional branch code lines is the second code type, and the comment information corresponding to the one of the uncovered conditional branch code lines is the fifth comment information. The coverage parameter corresponding to the one of the uncovered conditional branch code lines is determined as −1 if the code type of the conditional branch code lines is the second code type, and the comment information corresponding to the one of the uncovered conditional branch code lines is not the fifth comment information.

In an embodiment, the processor further implements the following steps when executing the one or more programs:
    The number of the conditional branch coverage corresponding to the target code is calculated by adding a total number of the conditional branch code lines in the target code and the coverage parameters corresponding to each of the uncovered conditional branch code lines in the target code.
    The conditional branch coverage corresponding to the target code is calculated according to a ratio of the number of the conditional branch coverage to the total number of the conditional branch code lines in the target code.

In an embodiment, the present disclosure further provides a non-transitory computer-readable storage medium, the non-transitory computer-readable storage medium stores a computer program, and when the computer program is executed by a processor, the following steps will be implemented:
    The code types of uncovered conditional branch code lines in target code are acquired, and the comment information corresponding to the uncovered conditional branch code lines is acquired according to the code type;
    The coverage parameters corresponding to the uncovered conditional branch code lines is acquired according to the comment information corresponding to the uncovered conditional branch code lines.
    The conditional branch coverage corresponding to the target code is calculated according to the coverage parameters corresponding to the uncovered conditional branch code lines and the total number of the conditional branch code lines in the target code.

In an embodiment, the computer program further implements the following steps when executed by the processor:
    The basic conditional branch coverage of the target code is acquired.
    The uncovered conditional branch code lines of the target code are acquired according to the basic conditional branch coverage of the target code.

In an embodiment, the computer program further implements the following steps when executed by the processor:
    Each of the conditional branch code lines is acquired in the target code, and the code type of each of the conditional branch code lines in the target code is identified.
    The comment type of each of the conditional branch code lines is determined according to the code type of each of the conditional branch code lines, and the comment information is added to each of the conditional branch code lines according to the comment type corresponding to each of the conditional branch code lines in the target code.

In an embodiment, the following steps will be further implemented when the computer program is executed by the processor:
    One of the conditional branch code lines is determined to correspond to the first comment type if the code type of the one of the conditional branch code lines is the first code type. The first comment type includes the first comment information, the second comment information, the third comment information and the fourth comment information. One of the first comment information, the second comment information, the third comment information and the fourth comment information is added to the one of the conditional branch code lines corresponding to the first code type, or no comment information is added to the conditional branch code lines corresponding to the first code type;
    The one of conditional branch code lines is determined to correspond to the second comment type if the code type of the one of the conditional branch code lines is the second code type. The second comment type includes the fifth comment information. The fifth comment information is added to the one of the conditional branch code lines, or no comment information is added to the one of the conditional branch code lines.

The first comment information is configured to indicate that a first part of the corresponding conditional branch code line is excluded. The second comment information is configured to indicate that a second part of the corresponding conditional branch code line is excluded. The third comment information is configured to indicate that the first part or the second part of the corresponding conditional branch code lines is excluded. The fourth comment information is configured to indicate that both of the first part and the second part of the corresponding conditional branch code line are excluded. The fifth comment information is configured to indicate that the whole corresponding conditional branch code line is excluded.

In an embodiment, the following steps will be further implemented when the computer program is executed by the processor:
    The uncovered type corresponding to one of the uncovered conditional branch code lines is acquired if the code type of the one of the conditional branch code lines is the first code type. The uncovered type includes the first part covered, the second part covered, and the fully uncovered.

The coverage parameter corresponding to the one of the uncovered conditional branch code lines is determined as 0 if the uncovered type of the one of the uncovered conditional branch code lines is the first part covered and the comment information corresponding to the one of the uncovered conditional branch code lines is the second comment information, the third comment information or the fourth comment information.

The coverage parameter corresponding to the one of the uncovered conditional branch code lines is determined as −1 if the uncovered type of the one of the uncovered conditional branch code lines is the first part covered and the comment information corresponding to the one of the uncovered conditional branch code lines is not the second comment information, the third comment information and the fourth comment information.

The coverage parameter corresponding to the one of the uncovered conditional branch code lines is determined as 0 if the uncovered type of the one of the uncovered conditional branch code lines is the second part covered, and the comment information corresponding to the one of the uncovered conditional branch code lines is the first comment information, the third comment information or the fourth comment information.

The coverage parameter corresponding to the one of the uncovered conditional branch code lines is determined as −1 if the uncovered type of the one of the uncovered conditional branch code lines is the second part covered, and the comment information corresponding to the one of the uncovered conditional branch code lines is not the first comment information, the third comment information or the fourth comment information.

The coverage parameter corresponding to the one of the uncovered conditional branch code lines is determined as 0 if the uncovered type of the one of the uncovered conditional branch code lines is the fully uncovered, and the comment information corresponding to the one of the uncovered conditional branch code lines is the fourth comment information.

The coverage parameter corresponding to the one of the uncovered conditional branch code lines is determined as −1 if the uncovered type of the one of the uncovered conditional branch code lines is the fully uncovered, and the comment information corresponding to the one of the uncovered conditional branch code lines is the first comment information, the second comment information or the third comment information.

The coverage parameter corresponding to the one of the uncovered conditional branch code lines is determined as −2 if the uncovered type of the one of the uncovered conditional branch code lines is the fully uncovered, and the comment information corresponding to the one of the uncovered conditional branch code lines is not the first comment information, the second comment information, the third comment information or the fourth comment information.

The coverage parameter corresponding to the one of the uncovered conditional branch code lines is determined as 0 if the code type of the conditional branch code lines is the second code type, and the comment information corresponding to the one of the uncovered conditional branch code lines is the fifth comment information.

The coverage parameter corresponding to the one of the uncovered conditional branch code lines is determined as −1 if the code type of the conditional branch code lines is the second code type, and the comment information corresponding to the one of the uncovered conditional branch code lines is not the fifth comment information.

In an embodiment, the following steps will be further implemented when the computer program is executed by the processor:

The number of the conditional branch coverage corresponding to the target code is calculated by adding a total number of the conditional branch code lines in the target code and the coverage parameters corresponding to each of the uncovered conditional branch code lines in the target code, The conditional branch coverage corresponding to the target code is calculated according to a ratio of the number of the conditional branch coverage to the total number of the conditional branch code lines in the target code.

In an embodiment, the present disclosure further provides a computer program product, which includes computer programs, when the computer programs executed by a processor, the following steps will be implemented:

Code types of uncovered conditional branch code lines in target code are acquired, and the comment information corresponding to the uncovered conditional branch code lines are acquired according to the code type.

Coverage parameters corresponding to the uncovered conditional branch code lines are acquired according to the comment information corresponding to the uncovered conditional branch code lines.

The conditional branch coverage corresponding to the target code is calculated according to the coverage parameters corresponding to the uncovered conditional branch code lines and a total number of the conditional branch code lines in the target code.

In an embodiment, when the computer programs are executed by the processor, the following steps will be further implemented:

A basic conditional branch coverage of the target code is acquired.

The uncovered conditional branch code lines of the target code are acquired according to the basic conditional branch coverage of the target code.

In an embodiment, when the computer programs are executed by the processor, the following steps will be further implemented:

Each of the conditional branch code lines in the target code is acquired, and the code type of each of the conditional branch code lines in the target codes is identified.

A comment type of each of the conditional branch code lines is determined according to the code type of each of the conditional branch code lines, and the comment information to each of the conditional branch code lines is added according to the comment type corresponding to each of the conditional branch code lines in the target code.

In an embodiment, when the computer programs are executed by the processor, the following steps will be further implemented:

One of the conditional branch code lines is determined to correspond to the first comment type if the code type of the one of the conditional branch code lines is the first code type. The first comment type includes a first comment information, a second comment information, a third comment information and a fourth comment information. One of the first comment information, the second comment information, the third comment information and the fourth comment information is added to the one of the conditional branch code lines corresponding to the first code type, or no comment information is added to the one of the conditional branch code lines corresponding to the first code type;

The one of the conditional branch code lines correspond to the second comment type if the code type of the one of the conditional branch code lines is the second code type. The second comment type includes the fifth comment information. the fifth comment information is added to the one of the conditional branch code lines corresponding to the second code type, or no comment information is added to the one of the conditional branch code lines corresponding to the second code type.

The first comment information is configured to indicate that a first part of the corresponding conditional branch code line is excluded. The second comment information is configured to indicate that the second part of the corresponding conditional branch code line is excluded. The third comment information is configured to indicate that the first part or the second part of the corresponding conditional branch code lines is excluded. The fourth comment information is configured to indicate that both of the first part and the second part of the corresponding conditional branch code line are excluded. The fifth comment information is configured to indicate that the whole corresponding conditional branch code line is excluded.

In an embodiment, when the computer programs are executed by the processor, the following steps will be further implemented:

The uncovered type corresponding to one of the uncovered conditional branch code lines if the code type of the one of the conditional branch code lines is the first code type. The uncovered type includes the first part covered, the second part covered, and the fully uncovered;

The coverage parameter corresponding to the one of the uncovered conditional branch code lines is determined as 0 if the uncovered type of the one of the uncovered conditional branch code lines is the first part covered and the comment information corresponding to the one of the uncovered conditional branch code lines is the second comment information, the third comment information or the fourth comment information.

The coverage parameter corresponding to the one of the uncovered conditional branch code lines is determined as −1 if the uncovered type of the one of the uncovered conditional branch code lines is the first part covered and the comment information corresponding to the one of the uncovered conditional branch code lines is not the second comment information, the third comment information and the fourth comment information.

The coverage parameter corresponding to the one of the uncovered conditional branch code lines is determined as 0 if the uncovered type of the one of the uncovered conditional branch code lines is the second part covered, and the comment information corresponding to the one of the uncovered conditional branch code lines is the first comment information, the third comment information or the fourth comment information.

The coverage parameter corresponding to the one of the uncovered conditional branch code lines is determined as −1 if the uncovered type of the one of the uncovered conditional branch code lines is the second part covered, and the comment information corresponding to the one of the uncovered conditional branch code lines is not the first comment information, the third comment information or the fourth comment information.

The coverage parameter corresponding to the one of the uncovered conditional branch code lines is determined as 0 if the uncovered type of the one of the uncovered conditional branch code lines is the fully uncovered, and the comment information corresponding to the one of the uncovered conditional branch code lines is the fourth comment information.

The coverage parameter corresponding to the one of the uncovered conditional branch code lines is determined as −1 if the uncovered type of the one of the uncovered conditional branch code lines is the fully uncovered, and the comment information corresponding to the one of the uncovered conditional branch code lines is the first comment information, the second comment information or the third comment information.

The coverage parameter corresponding to the one of the uncovered conditional branch code lines is determined as −2 if the uncovered type of the one of the uncovered conditional branch code lines is the fully uncovered, and the comment information corresponding to the one of the uncovered conditional branch code lines is not the first comment information, the second comment information, the third comment information or the fourth comment information.

The coverage parameter corresponding to the one of the uncovered conditional branch code lines is determined as 0 if the code type of the conditional branch code lines is the second code type, and the comment information corresponding to the one of the uncovered conditional branch code lines is the fifth comment information.

The coverage parameter corresponding to the one of the uncovered conditional branch code lines is determined as −1 if the code type of the conditional branch code lines is the second code type, and the comment information corresponding to the one of the uncovered conditional branch code lines is not the fifth comment information.

In an embodiment, when the computer programs are executed by the processor, the following steps will be further implemented:

The number of the conditional branch coverage corresponding to the target code by adding the total number of the conditional branch code lines in the target code and the coverage parameters corresponding to each of the uncovered conditional branch code lines in the target code.

The conditional branch coverage corresponding to the target code is calculated according to a ratio of a number of the conditional branch coverage to a total number of the conditional branch code lines in the target code.

In the aforementioned conditional branch coverage calculation method, device, computer apparatus, storage medium and computer program product, the code types of the uncovered conditional branch code lines in the target code is acquired, and the comment information corresponding to the uncovered conditional branch code lines is acquired according to the code types. The coverage parameters corresponding to the uncovered conditional branch code lines are acquired according to the comment information corresponding to the uncovered conditional branch code lines. The conditional branch coverage corresponding to the target code is calculated according to the coverage parameters corresponding to the uncovered conditional branch code lines and the total number of the conditional branch code lines in the target code. Conditional branch code lines that do not need to be calculated can be excluded according to the comment information corresponding to each of the conditional branch code lines, thereby improving the calculation accuracy of the conditional branch coverage.

It should be noted that the user information (including but not limited to user apparatus information, user personal information, etc.) and data (including but not limited to data for analysis, stored data, displayed data, etc.) involved in the present disclosure are all authorized by the user or fully authorized by all parties. The collection, use and processing of the relevant data need to comply with the relevant laws, regulations and standards of the relevant countries and regions.

Those skilled in the art can understand that all or part of the processes of the methods of the above embodiments can be implemented by instructing relevant hardware through a computer program, and the computer program can be stored in a non-volatile computer-readable storage medium. When the computer program is executed, it can implement the processes of the aforementioned embodiments of the methods. Any reference to a memory, a database or other media used in the embodiments provided in the present disclosure may include at least one of a non-volatile memory and a volatile memory. The Non-volatile memory may include a Read-Only Memory (ROM), a magnetic tape, a floppy disk, a flash memory, an optical memory, a high-density embedded non-volatile memory, a resistive memory (ReRAM), a Magnetoresistive Random Access Memory (MRAM), a Ferroelectric Random Access Memory (FRAM), a Phase Change Memory (PCM), or a graphene memory, etc. The volatile memory may include a Random Access Memory (RAM) or an external cache memory, and the like. By way of illustration and not limitation, the RAM may be in various forms, such as a Static Random Access Memory (SRAM) or a Dynamic Random Access Memory (DRAM). The database involved in the embodiments provided in the present disclosure may include at least one of a relational database or a non-relational database. The non-relational database may include a blockchain-based distributed database, etc., but is not limited thereto. The processors involved in the embodiments provided in present disclosure may be general-purpose processors, central processing units, graphics processors, digital signal processors, programmable logic devices, data processing logic devices based on quantum computing, etc., and is not limited to this.

The above embodiments of the technical features can be carried out in any combination, in order to make the description concise, not all possible combinations of the technical features of the above embodiments are described. However, as long as the combination of these technical features do not contradict, these technical features should be considered to be within the scope of the description of this specification.

The aforementioned embodiments only illustrate several embodiments of the present disclosure, and the descriptions thereof are relatively specific and detailed, but should not be construed as a limitation on the scope of the patent of the present disclosure. It should be noted that for those skilled in the art, without departing from the concept of the present disclosure, several modifications and improvements can be made, which all fall within the protection scope of the present disclosure. Therefore, the scope of protection of the present disclosure shall be subject to the appended claims.

What is claimed is:

1. A conditional branch coverage calculation method, the method comprising:
    acquiring code types of uncovered conditional branch code lines in a target code, and acquiring comment information corresponding to the uncovered conditional branch code lines according to the code types;
    acquiring coverage parameters corresponding to the uncovered conditional branch code lines according to the comment information corresponding to the uncovered conditional branch code lines; and
    calculating a conditional branch coverage corresponding to the target code according to the coverage parameters corresponding to the uncovered conditional branch code lines and a total number of the conditional branch code lines in the target code.

2. The method according to claim 1, wherein a method for acquiring the uncovered conditional branch code lines in the target code comprises:
    acquiring a basic conditional branch coverage of the target code; and
    acquiring the uncovered conditional branch code lines in the target code according to the basic conditional branch coverage of the target code.

3. The method according to claim 1, wherein before the acquiring the code types of the uncovered conditional branch code lines in target code, and acquiring the comment information corresponding to the uncovered conditional branch code lines according to the code type, the method further comprises:
    acquiring each of the conditional branch code lines in the target code, and identifying the code type of each of the conditional branch code lines in the target code; and
    determining a comment type corresponding to each of the conditional branch code lines according to the code type of each of the conditional branch code lines, and adding the comment information to each of the conditional branch code lines according to the comment type of each of the conditional branch code lines in the target code.

4. The method according to claim 3, wherein the determining the comment type corresponding to each of the conditional branch code lines according to the code type of each of the conditional branch code lines, and adding the comment information to each of the conditional branch code lines according to the comment type of each of the conditional branch code lines in the target code comprises:
    determining that one of the conditional branch code lines corresponds to a first comment type if the code type of the one of the conditional branch code lines is a first code type, wherein the first comment type comprises a first comment information, a second comment information, a third comment information and a fourth comment information, and adding one of the first comment information, the second comment information, the third comment information and the fourth comment information to the one of the conditional branch code lines corresponding to the first code type, or adding no comment information to the one of the conditional branch code lines corresponding to the first code type;
    determining that the one of the conditional branch code lines correspond to a second comment type if the code type of the one of the conditional branch code lines is a second code type, wherein the second comment type comprises a fifth comment information, and adding the fifth comment information to the one of the conditional branch code lines corresponding to the second code type, or adding no comment information to the one of the conditional branch code lines corresponding to the second code type;
    wherein the first comment information is configured to indicate that a first part of the corresponding conditional branch code line is excluded, the second comment information is configured to indicate that a second part of the corresponding conditional branch code line is excluded, the third comment information is configured to indicate that the first part or the second part of the conditional branch code line is excluded, the fourth comment information is configured to indicate that both of the first part and the second part of the corresponding conditional branch code lines are excluded, and the fifth comment information is configured to indicate that the whole corresponding conditional branch code line is excluded.

5. The method according to claim 4, wherein the acquiring the coverage parameter corresponding to the one of the uncovered conditional branch code lines according to the comment information corresponding to the one of the uncovered conditional branch code lines comprises:
acquiring an uncovered type corresponding to the one of the uncovered conditional branch code lines if the code type of the one of the conditional branch code lines is the first code type, wherein the uncovered type comprise a first part covered, a second part covered, and a fully uncovered;
determining that the coverage parameter corresponding to the one of the uncovered conditional branch code lines is 0 if the uncovered type of the one of the uncovered conditional branch code lines is the first part covered, and the comment information corresponding to the one of the uncovered conditional branch code lines is the second comment information, the third comment information or the fourth comment information;
determining that the coverage parameter corresponding to the one of the uncovered conditional branch code lines is −1 if the uncovered type of the one of the uncovered conditional branch code lines is the first part covered, and the comment information corresponding to the one of the uncovered conditional branch code lines is not the second comment information, the third comment information or the fourth comment information;
determining that the coverage parameter corresponding to the one of the uncovered conditional branch code lines is 0 if the uncovered type of the one of the uncovered conditional branch code lines is the second part covered, and the comment information corresponding to the one of the uncovered conditional branch code lines is the first comment information, the third comment information or the fourth comment information;
determining that the coverage parameter corresponding to the one of the uncovered conditional branch code lines is −1 if the uncovered type of the one of the uncovered conditional branch code lines is the second part covered, and the comment information corresponding to the one of the uncovered conditional branch code lines is not the first comment information, the third comment information or the fourth comment information;
determining that the coverage parameter corresponding to the one of the uncovered conditional branch code lines is 0 if the uncovered type of the one of the uncovered conditional branch code lines is the fully uncovered, and the comment information corresponding to the one of the uncovered conditional branch code lines is the fourth comment information;
determining that the coverage parameter corresponding to the one of the uncovered conditional branch code lines is −1 if the uncovered type of the one of the uncovered conditional branch code lines is the fully uncovered, and the comment information corresponding to the one of the uncovered conditional branch code lines is the first comment information, the second comment information or the third comment information;
determining that the coverage parameter corresponding to the one of the uncovered conditional branch code lines is −2 if the uncovered type of one of the uncovered conditional branch code lines is the fully uncovered, and the comment information corresponding to the one of the uncovered conditional branch code lines is not the first comment information, the second comment information, the third comment information or the fourth comment information;
determining that the coverage parameter corresponding to the one of the uncovered conditional branch code lines is 0 if the code type of the one of the conditional branch code lines is the second code type, and the comment information corresponding to the one of the uncovered conditional branch code lines is the fifth comment information; and
determining that the coverage parameter corresponding to the one of the uncovered conditional branch code lines is −1 if the code type of the one of the conditional branch code lines is the second code type, and the comment information corresponding to the one of the uncovered conditional branch code lines is not the fifth comment information.

6. The method according to claim 5, wherein the calculating the conditional branch coverage corresponding to the target code according to the coverage parameters corresponding to the uncovered conditional branch code lines and the total number of the conditional branch code lines in the target code comprises:
calculating a number of the conditional branch coverage corresponding to the target code by adding the total number of the conditional branch code lines in the target code and the coverage parameters corresponding to each of the uncovered conditional branch code lines in the target code; and
calculating the conditional branch coverage corresponding to the target code according to a ratio of the number of the conditional branch coverage to the total number of the conditional branch code lines in the target code.

7. A computer apparatus, comprising:
one or more memories; and
one or more processors,
wherein one or more programs are stored in the one or more memories, and when the one or more programs are executed by the one or more processors, the computer apparatus executes steps of a method comprising
acquiring code types of uncovered conditional branch code lines in a target code, and acquiring comment information corresponding to the uncovered conditional branch code lines according to the code types;
acquiring coverage parameters corresponding to the uncovered conditional branch code lines according to the comment information corresponding to the uncovered conditional branch code lines; and
calculating a conditional branch coverage corresponding to the target code according to the coverage parameters corresponding to the uncovered conditional branch code lines and a total number of the conditional branch code lines in the target code.

8. The computer apparatus according to claim 1, wherein a method for acquiring the uncovered conditional branch code lines in the target code comprises:
acquiring a basic conditional branch coverage of the target code; and
acquiring the uncovered conditional branch code lines in the target code according to the basic conditional branch coverage of the target code.

9. The computer apparatus according to claim 1, wherein before the acquiring the code types of the uncovered conditional branch code lines in target code, and acquiring the comment information corresponding to the uncovered conditional branch code lines according to the code type, the method further comprises:
    acquiring each of the conditional branch code lines in the target code, and identifying the code type of each of the conditional branch code lines in the target code; and
    determining a comment type corresponding to each of the conditional branch code lines according to the code type of each of the conditional branch code lines, and adding the comment information to each of the conditional branch code lines according to the comment type of each of the conditional branch code lines in the target code.

10. The computer apparatus according to claim 9, wherein the determining the comment type corresponding to each of the conditional branch code lines according to the code type of each of the conditional branch code lines, and adding the comment information to each of the conditional branch code lines according to the comment type of each of the conditional branch code lines in the target code comprises:
    determining that one of the conditional branch code lines corresponds to a first comment type if the code type of the one of the conditional branch code lines is a first code type, wherein the first comment type comprises a first comment information, a second comment information, a third comment information and a fourth comment information, and adding one of the first comment information, the second comment information, the third comment information and the fourth comment information to the one of the conditional branch code lines corresponding to the first code type, or adding no comment information to the one of the conditional branch code lines corresponding to the first code type;
    determining that the one of the conditional branch code lines correspond to a second comment type if the code type of the one of the conditional branch code lines is a second code type, wherein the second comment type comprises a fifth comment information, and adding the fifth comment information to the one of the conditional branch code lines corresponding to the second code type, or adding no comment information to the one of the conditional branch code lines corresponding to the second code type;
    wherein the first comment information is configured to indicate that a first part of the corresponding conditional branch code line is excluded, the second comment information is configured to indicate that a second part of the corresponding conditional branch code line is excluded, the third comment information is configured to indicate that the first part or the second part of the conditional branch code line is excluded, the fourth comment information is configured to indicate that both of the first part and the second part of the corresponding conditional branch code lines are excluded, and the fifth comment information is configured to indicate that the whole corresponding conditional branch code line is excluded.

11. The computer apparatus according to claim 10, wherein the acquiring the coverage parameter corresponding to the one of the uncovered conditional branch code lines according to the comment information corresponding to the one of the uncovered conditional branch code lines comprises:
    acquiring an uncovered type corresponding to the one of the uncovered conditional branch code lines if the code type of the one of the conditional branch code lines is the first code type, wherein the uncovered type comprise a first part covered, a second part covered, and a fully uncovered;
    determining that the coverage parameter corresponding to the one of the uncovered conditional branch code lines is 0 if the uncovered type of the one of the uncovered conditional branch code lines is the first part covered, and the comment information corresponding to the one of the uncovered conditional branch code lines is the second comment information, the third comment information or the fourth comment information;
    determining that the coverage parameter corresponding to the one of the uncovered conditional branch code lines is −1 if the uncovered type of the one of the uncovered conditional branch code lines is the first part covered, and the comment information corresponding to the one of the uncovered conditional branch code lines is not the second comment information, the third comment information or the fourth comment information;
    determining that the coverage parameter corresponding to the one of the uncovered conditional branch code lines is 0 if the uncovered type of the one of the uncovered conditional branch code lines is the second part covered, and the comment information corresponding to the one of the uncovered conditional branch code lines is the first comment information, the third comment information or the fourth comment information;
    determining that the coverage parameter corresponding to the one of the uncovered conditional branch code lines is −1 if the uncovered type of the one of the uncovered conditional branch code lines is the second part covered, and the comment information corresponding to the one of the uncovered conditional branch code lines is not the first comment information, the third comment information or the fourth comment information;
    determining that the coverage parameter corresponding to the one of the uncovered conditional branch code lines is 0 if the uncovered type of the one of the uncovered conditional branch code lines is the fully uncovered, and the comment information corresponding to the one of the uncovered conditional branch code lines is the fourth comment information;
    determining that the coverage parameter corresponding to the one of the uncovered conditional branch code lines is −1 if the uncovered type of the one of the uncovered conditional branch code lines is the fully uncovered, and the comment information corresponding to the one of the uncovered conditional branch code lines is the first comment information, the second comment information or the third comment information;
    determining that the coverage parameter corresponding to the one of the uncovered conditional branch code lines is −2 if the uncovered type of one of the uncovered conditional branch code lines is the fully uncovered, and the comment information corresponding to the one of the uncovered conditional branch code lines is not the first comment information, the second comment information, the third comment information or the fourth comment information;
    determining that the coverage parameter corresponding to the one of the uncovered conditional branch code lines is 0 if the code type of the one of the conditional branch code lines is the second code type, and the comment information corresponding to the one of the uncovered conditional branch code lines is the fifth comment information; and determining that the coverage parameter corresponding to the one of the uncovered conditional branch code lines is −1 if the code type of the one of the conditional branch code lines is the second code type, and the comment information corresponding to the one of the uncovered conditional branch code lines is not the fifth comment information.

12. The computer apparatus according to claim 10, wherein the calculating the conditional branch coverage corresponding to the target code according to the coverage parameters corresponding to the uncovered conditional branch code lines and the total number of the conditional branch code lines in the target code comprises:
calculating a number of the conditional branch coverage corresponding to the target code by adding the total number of the conditional branch code lines in the target code and the coverage parameters corresponding to each of the uncovered conditional branch code lines in the target code; and
calculating the conditional branch coverage corresponding to the target code according to a ratio of the number of the conditional branch coverage to the total number of the conditional branch code lines in the target code.

13. A non-transitory computer-readable storage medium, on which a computer program is stored, wherein when the computer program is executed by a processor, steps of a method comprising:
acquiring code types of uncovered conditional branch code lines in a target code, and acquiring comment information corresponding to the uncovered conditional branch code lines according to the code types;
acquiring coverage parameters corresponding to the uncovered conditional branch code lines according to the comment information corresponding to the uncovered conditional branch code lines; and
calculating a conditional branch coverage corresponding to the target code according to the coverage parameters corresponding to the uncovered conditional branch code lines and a total number of the conditional branch code lines in the target code.

14. The non-transitory computer-readable storage medium according to claim 13, wherein a method for acquiring the uncovered conditional branch code lines in the target code comprises:
acquiring a basic conditional branch coverage of the target code; and
acquiring the uncovered conditional branch code lines in the target code according to the basic conditional branch coverage of the target code.

15. The non-transitory computer-readable storage medium according to claim 13, wherein before the acquiring the code types of the uncovered conditional branch code lines in target code, and acquiring the comment information corresponding to the uncovered conditional branch code lines according to the code type, the method further comprises:
acquiring each of the conditional branch code lines in the target code, and identifying the code type of each of the conditional branch code lines in the target code; and
determining a comment type corresponding to each of the conditional branch code lines according to the code type of each of the conditional branch code lines, and adding the comment information to each of the conditional branch code lines according to the comment type of each of the conditional branch code lines in the target code.

16. The non-transitory computer-readable storage medium according to claim 15, wherein the determining the comment type corresponding to each of the conditional branch code lines according to the code type of each of the conditional branch code lines, and adding the comment information to each of the conditional branch code lines according to the comment type of each of the conditional branch code lines in the target code comprises:
determining that one of the conditional branch code lines corresponds to a first comment type if the code type of the one of the conditional branch code lines is a first code type, wherein the first comment type comprises a first comment information, a second comment information, a third comment information and a fourth comment information, and adding one of the first comment information, the second comment information, the third comment information and the fourth comment information to the one of the conditional branch code lines corresponding to the first code type, or adding no comment information to the one of the conditional branch code lines corresponding to the first code type;
determining that the one of the conditional branch code lines correspond to a second comment type if the code type of the one of the conditional branch code lines is a second code type, wherein the second comment type comprises a fifth comment information, and adding the fifth comment information to the one of the conditional branch code lines corresponding to the second code type, or adding no comment information to the one of the conditional branch code lines corresponding to the second code type;
wherein the first comment information is configured to indicate that a first part of the corresponding conditional branch code line is excluded, the second comment information is configured to indicate that a second part of the corresponding conditional branch code line is excluded, the third comment information is configured to indicate that the first part or the second part of the conditional branch code line is excluded, the fourth comment information is configured to indicate that both of the first part and the second part of the corresponding conditional branch code lines are excluded, and the fifth comment information is configured to indicate that the whole corresponding conditional branch code line is excluded.

17. The non-transitory computer-readable storage medium according to claim 16, wherein the acquiring the coverage parameter corresponding to the one of the uncovered conditional branch code lines according to the comment information corresponding to the one of the uncovered conditional branch code lines comprises:
acquiring an uncovered type corresponding to the one of the uncovered conditional branch code lines if the code type of the one of the conditional branch code lines is the first code type, wherein the uncovered type comprise a first part covered, a second part covered, and a fully uncovered;
determining that the coverage parameter corresponding to the one of the uncovered conditional branch code lines is 0 if the uncovered type of the one of the uncovered conditional branch code lines is the first part covered, and the comment information corresponding to the one of the uncovered conditional branch code lines is the second comment information, the third comment information or the fourth comment information;

determining that the coverage parameter corresponding to the one of the uncovered conditional branch code lines is −1 if the uncovered type of the one of the uncovered conditional branch code lines is the first part covered, and the comment information corresponding to the one of the uncovered conditional branch code lines is not the second comment information, the third comment information or the fourth comment information;

determining that the coverage parameter corresponding to the one of the uncovered conditional branch code lines is 0 if the uncovered type of the one of the uncovered conditional branch code lines is the second part covered, and the comment information corresponding to the one of the uncovered conditional branch code lines is the first comment information, the third comment information or the fourth comment information;

determining that the coverage parameter corresponding to the one of the uncovered conditional branch code lines is −1 if the uncovered type of the one of the uncovered conditional branch code lines is the second part covered, and the comment information corresponding to the one of the uncovered conditional branch code lines is not the first comment information, the third comment information or the fourth comment information;

determining that the coverage parameter corresponding to the one of the uncovered conditional branch code lines is 0 if the uncovered type of the one of the uncovered conditional branch code lines is the fully uncovered, and the comment information corresponding to the one of the uncovered conditional branch code lines is the fourth comment information;

determining that the coverage parameter corresponding to the one of the uncovered conditional branch code lines is −1 if the uncovered type of the one of the uncovered conditional branch code lines is the fully uncovered, and the comment information corresponding to the one of the uncovered conditional branch code lines is the first comment information, the second comment information or the third comment information;

determining that the coverage parameter corresponding to the one of the uncovered conditional branch code lines is −2 if the uncovered type of one of the uncovered conditional branch code lines is the fully uncovered, and the comment information corresponding to the one of the uncovered conditional branch code lines is not the first comment information, the second comment information, the third comment information or the fourth comment information;

determining that the coverage parameter corresponding to the one of the uncovered conditional branch code lines is 0 if the code type of the one of the conditional branch code lines is the second code type, and the comment information corresponding to the one of the uncovered conditional branch code lines is the fifth comment information; and determining that the coverage parameter corresponding to the one of the uncovered conditional branch code lines is −1 if the code type of the one of the conditional branch code lines is the second code type, and the comment information corresponding to the one of the uncovered conditional branch code lines is not the fifth comment information.

18. The non-transitory computer-readable storage medium according to claim 17, wherein the calculating the conditional branch coverage corresponding to the target code according to the coverage parameters corresponding to the uncovered conditional branch code lines and the total number of the conditional branch code lines in the target code comprises:

calculating a number of the conditional branch coverage corresponding to the target code by adding the total number of the conditional branch code lines in the target code and the coverage parameters corresponding to each of the uncovered conditional branch code lines in the target code; and calculating the conditional branch coverage corresponding to the target code according to a ratio of the number of the conditional branch coverage to the total number of the conditional branch code lines in the target code.

\* \* \* \* \*